(12) United States Patent
Straut et al.

(10) Patent No.: US 7,219,138 B2
(45) Date of Patent: May 15, 2007

(54) METHOD, APPARATUS, AND SYSTEM FOR CAPTURING DATA EXCHANGED BETWEEN A SERVER AND A USER

(75) Inventors: Christopher Straut, Duluth, GA (US); Albert S. Boyers, Atlanta, GA (US); Joseph H. Owen, Jr., Douglasville, GA (US); Ram Choragudi, Alpharetta, GA (US)

(73) Assignee: Witness Systems, Inc., Roswell, GA (US)

( * ) Notice: Subject to any disclaimer, the term of this patent is extended or adjusted under 35 U.S.C. 154(b) by 556 days.

(21) Appl. No.: 10/061,469

(22) Filed: Jan. 31, 2002

(65) Prior Publication Data

US 2003/0145071 A1 Jul. 31, 2003

(51) Int. Cl.
*G06F 13/00* (2006.01)
(52) U.S. Cl. .................. 709/219; 709/224; 709/227; 719/328
(58) Field of Classification Search ............ 709/217, 709/219, 223, 224, 227; 719/328, 329
See application file for complete search history.

(56) References Cited

U.S. PATENT DOCUMENTS

| | | | |
|---|---|---|---|
| 3,594,919 A | 7/1971 | De Belle et al. |
| 3,705,271 A | 12/1972 | De Belle et al. |
| 4,684,349 A | 8/1987 | Ferguson et al. |
| 5,101,402 A | 3/1992 | Chiu et al. |
| 5,267,865 A | 12/1993 | Lee et al. |
| 5,311,422 A | 5/1994 | Loftin et al. |
| 5,511,165 A | 4/1996 | Brady et al. |
| 5,581,614 A | 12/1996 | Ng et al. |
| 5,597,312 A | 1/1997 | Bloom et al. |
| 5,717,879 A | 2/1998 | Moran et al. |
| 5,790,798 A | 8/1998 | Beckett, II et al. |
| 5,809,250 A | 9/1998 | Kisor |

(Continued)

OTHER PUBLICATIONS

"Customer Spotlight: Navistar International," Web page, unverified print date of Apr. 1, 2002.

(Continued)

*Primary Examiner*—Viet D. Vu
(74) *Attorney, Agent, or Firm*—Fish & Richardson P.C.

(57) ABSTRACT

Data exchanged between at least one server and at least one user is intercepted in a capturing module that operates independently from the server and the user. A copy of the intercepted data is stored in a database. The intercepted data that is destined for the server is forwarded to the server, or the intercepted data that is destined for the user is forwarded to the user. The intercepting and storing are performed transparently to the user. Interception of data may be performed continuously, and storing of data may be performed during a predetermined time window or at predetermined time intervals. The intercepted data may include events, attributes, images, user identifications, requests, and/or responses. Only a predetermined portion of the data and/or data that satisfies predefined rules is stored. The user may be a web server or a web browser, and the server may be a web server. The data may be exchanged in the form of an Internet protocol and assembled into a web page view for the user. Interception and storing may be performed concurrently for capturing data exchanged simultaneously between a plurality of servers and the user, the server and a plurality of users, or a plurality of servers and a plurality of users.

25 Claims, 4 Drawing Sheets

U.S. PATENT DOCUMENTS

| | | |
|---|---|---|
| 5,825,869 A | 10/1998 | Brooks et al. |
| 5,926,836 A | 7/1999 | Blumenau |
| 5,958,016 A | 9/1999 | Chang et al. |
| 5,964,836 A | 10/1999 | Rowe et al. |
| 5,978,648 A | 11/1999 | George et al. |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,061,798 A * | 5/2000 | Coley et al. ............ 726/12 |
| 6,076,099 A | 6/2000 | Chen et al. |
| 6,078,894 A | 6/2000 | Clawson et al. |
| 6,108,711 A | 8/2000 | Beck et al. |
| 6,115,751 A | 9/2000 | Tam et al. |
| 6,122,665 A | 9/2000 | Bar et al. |
| 6,122,668 A | 9/2000 | Teng et al. |
| 6,138,139 A | 10/2000 | Beck et al. |
| 6,144,991 A | 11/2000 | England |
| 6,146,148 A | 11/2000 | Stuppy |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Puram et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 * | 2/2002 | Dillon ............ 370/432 |
| 6,370,574 B1 | 4/2002 | House et al. |
| 6,404,857 B1 | 6/2002 | Blair et al. |
| 6,408,064 B1 | 6/2002 | Fedorov et al. |
| 6,418,471 B1 * | 7/2002 | Shelton et al. ............ 709/227 |
| 6,421,427 B1 | 7/2002 | Hill et al. |
| 6,437,818 B1 | 8/2002 | Ludwig et al. |
| 6,445,776 B1 | 9/2002 | Shank et al. |
| 6,453,345 B2 | 9/2002 | Trcka et al. |
| 6,459,787 B2 | 10/2002 | McIlwaine et al. |
| 6,493,758 B1 | 12/2002 | McLain |
| 6,502,131 B1 | 12/2002 | Vaid et al. |
| 6,510,469 B1 | 1/2003 | Starnes et al. |
| 6,535,909 B1 * | 3/2003 | Rust ............ 709/204 |
| 6,542,602 B1 | 4/2003 | Elazar |
| 6,543,004 B1 | 4/2003 | Cagle et al. |
| 6,546,405 B2 | 4/2003 | Gupta et al. |
| 6,583,806 B2 | 6/2003 | Ludwig et al. |
| 6,603,854 B1 | 8/2003 | Judkins et al. |
| 6,604,093 B1 | 8/2003 | Etzion et al. |
| 6,606,657 B1 * | 8/2003 | Zilberstein et al. ......... 709/224 |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,214 B1 | 8/2004 | McClain et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,993,494 B1 | 1/2006 | Boushy et al. |
| 7,003,517 B1 | 2/2006 | Seibel et al. |
| 7,047,297 B2 * | 5/2006 | Huntington et al. ......... 709/224 |
| 2001/0000962 A1 | 5/2001 | Rajan |
| 2001/0014143 A1 | 8/2001 | Kuhn |
| 2001/0032335 A1 | 10/2001 | Jones |
| 2001/0043697 A1 | 11/2001 | Cox et al. |
| 2002/0009190 A1 | 1/2002 | McIlwaine et al. |
| 2002/0038363 A1 | 3/2002 | MacLean |
| 2002/0052948 A1 | 5/2002 | Baudu et al. |
| 2002/0065911 A1 * | 5/2002 | von Klopp et al. ......... 709/224 |
| 2002/0065912 A1 | 5/2002 | Catchpole et al. |
| 2002/0112048 A1 | 8/2002 | Gruyer et al. |
| 2002/0128925 A1 * | 9/2002 | Angeles ............ 705/26 |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0140121 A1 | 7/2003 | Adams |
| 2003/0144900 A1 * | 7/2003 | Whitmer ............ 705/11 |
| 2003/0154240 A1 | 8/2003 | Nygren et al. |
| 2004/0100507 A1 * | 5/2004 | Hayner et al. ............ 345/855 |
| 2004/0165717 A1 | 8/2004 | McIlwaine et al. |
| 2004/0249650 A1 | 12/2004 | Freedman et al. |
| 2005/0138560 A1 | 6/2005 | Lee et al. |
| 2005/0240656 A1 | 10/2005 | Blair |
| 2006/0165003 A1 | 7/2006 | Partridge |

OTHER PUBLICATIONS

"DKSystems Integrates QM Perception with OnTrack for Training," Web page, unverified print date of Apr. 1, 2002, unverified cover date of Jun. 15, 1999.

"PriceWaterhouseCoopers Case Study: The Business Challenge," Web page, unverified cover date of 2000.

'OnTrack Online' Delivers New Web Functionality, Web page, unverified print date of Apr. 2, 2002, unverified cover date of Oct. 5, 1999.

Untitled. 10th Mediterranean Electrotechnical Conference vol. 1 pp. 124-126 (2000).

Unknown Author. "Long-distance learning," *InfoWorld* 20(36):7276 (1998).

Abstract. net.working: "An Online Webliography," *Technical Training* pp. 4-5 (Nov./Dec. 1998).

Adams et al. "Our Turn-of-the-Century Trend Watch" *Technical Training* pp. 46-47 (Nov./Dec. 1998).

Barron. "The Road to Performance: Three Vignettes," *Technical Skills and Training* pp. 12-14 (Jan. 1997).

Bauer. "Technology Tools: Just-in-Time Desktop Training is Quick, Easy, and Affordable," *Technical Training* pp. 8-11 (May/Jun. 1998).

Beck et al. "Applications of AI in Education," *AMC Crossroads* vol. 1:1-13 (Fall 1996), Web page, unverified print date of Apr. 12, 2002.

Benson and Cheney. "Best Practices in Training Delivery," *Technical Training* pp. 14-17 (Oct. 1996).

Bental and Cawsey. "Personalized and Adaptive Systems for Medical Consumer Applications," *Communications ACM* 45(5):62-63 (May 2002).

Benyon and Murray. "Adaptive Systems: from intelligent tutoring to autonomous agents," pp. 1-52, Web page, unknown date.

Blumenthal et al. "Reducing Development Costs with Intelligent Tutoring System Shells," pp. 1-5, Web page, unverified print date of Apr. 9, 2002, unverified cover date of Jun. 10, 1996.

Brusilosky et al. "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin. "ISIS-Tutor: An Intelligent Learning Environment for CDS/ISIS Users," pp. 1-15 Web page, unverified print date of May 2, 2002.

Brusilovsky. "Adaptive Educational Systems on the World-Wide-Web: A Review of Available Technologies," pp. 1-10, Web Page, unverified print date of Apr. 12, 2002.

Byrnes et al. "The Development of a Multiple-Choice and True-False Testing Environment on the Web," pp. 1-8, Web page, unverified print date Apr. 12, 2002, unverified cover date of 1995.

Calvi and De Bra. "Improving the Usability of Hypertext Courseware through Adaptive Linking," *ACM*, unknown page numbers (1997).

Colfey. "Are Performance Objectives Really Necessary?" *Technical Skills and Training* pp. 25-27 (Oct. 1995).

Cohen. "Knowledge Management's Killer App," pp. 1-11, Web page, unverified print date of Apr. 12, 2002, unverified cover date of 2001.

Cole-Gomolski. "New ways to manage E-Classes," *Computerworld* 32(48):4344 (Nov. 30, 1998).

Cross. "Sun Microsystems—the SunTAN Story," Internet Time Group © (© 2001).

Cybulski and Linden. "Teaching Systems Analysis and Design Using Multimedia and Patterns." unknown date, unknown source.

De Bra et al. "Adaptive Hypermedia: From Systems to Framework," *ACM* (2000).

De Bra. "Adaptive Educational Hypermedia on the Web," *Communications ACM* 45(5):60-61 (May 2002).

Dennis and Gruner. "Computer Managed Instruction at Arthur Andersen & Company: A Status Report," *Educational Tech*nical pp. 7-16 (Mar. 1992).

Diessel et al. "Individualized Course Generation: A Marriage Between CAL and ICAL," *Computers Educational* 22(1/2)57-64 (1994).

Dyreson. "An Experiment in Class Management Using the World-Wide Web," pp. 1-12, Web page, unverified print date of Apr. 12, 2002.

E Learning Community. "Excellence in Practice Award: Electronic Learning Technologies," *Personal Learning Network* pp. 1-11, Web Page, unverified print date of Apr. 12, 2002.

*e-Learning the future of learning*, THINQ Limited, London. Version 1.0 (2000).

Eklund and Brusilovsky. "The Value of Adaptivity in Hypermedia Learning Environments: A Short Review of Empirical Evidence," pp. 1-8, Web page, unverified print date of May 2, 2002.

Eline. "Case Study: Bridging the Gap in Canada's IT Skills," *Technical Skills and Training* pp. 23-25 (Jul. 1997).

Eline. "A Trainer's Guide to Skill Building," *Technical Training* pp. 34-41 (Sep./Oct. 1998).

Eline. "Case Study: IBT's Place in the Sun," *Technical Training* pp. 12-17 (Aug./Sep. 1997).

Fritz. "ToolBook II: Asymetrix's updated authoring software tackles the Web," *Emedia Professional* 10(2):102106 (Feb. 1997).

Fritz. "CB templates for productivity: Authoring system templates foe trainers," *Emedia Professional* 10(8):6876 (Aug. 1997).

Gibson et al. "A Comparative Analysis of Web-Based Testing and Evaluation Systems," pp. 1-8, Web page, unverified print date of Apr. 11, 2002.

Hallberg and DeFiore. "Curving Toward Performance: Following a Hierarchy of Steps Toward a Performance Orientation," *Technical Skills and Training* pp. 9-11 (Jan. 1997).

Harsha. "Online Training 'Sprints' Ahead," *Technical Training* pp. 27-29 (Jan./Feb. 1999).

Heideman. "Writing Performance Objectives Simple as A-B-C (and D)," *Technical Skills and Training* pp. 5-7 (May/Jun. 1996).

Heideman. "Training Technicians for a High-Tech Future: These six steps can help develop technician training for high-tech work," pp. 11-14 (Feb./Mar. 1995).

Hollman. "Train Without Pain: The Benefits of Computer-Based Training Tools," pp. 1-11, Web page, unverified print date of Mar. 20, 2002, unverified cover date of Jan. 1, 2000.

Klein. "Command Decision Training Support Technology," Web page, unverified print date of Apr. 12, 2002.

Koonoc. "Where Technology and Training Meet," *Technical Training* pp. 10-15 (Nov./Dec. 1998).

Kursh. "Going the distance with Web-based training," *Training and Development* 52(3):5053 (Mar. 1998).

Larson. "Enhancing Performance Through Customized Online Learning Support," *Technical Skills and Training* pp. 25-27 (May/Jun. 1997).

Linton et al. "OWL: A Recommender System for Organization-Wide Learning," *Educational Technical Society* 3(1):62-76 (2000).

Lucadamo and Cheney. "Best Practices in Technical Training," *Technical Training* pp. 21-26 (Oct. 1997).

McNamara. "Monitoring Solutions: Quality Must Be Seen and Heard," *Inbound/Outbound* pp. 66-67 (Dec. 1989).

Merrill. "The New Component Design Theory: Instruction design for courseware authoring," *Instructional Science* 16:19-34 (1987).

Minton-Eversole. "IBT Training Truths Behind the Hype," *Technical Skills and Training* pp. 15-19 (Jan. 1997).

Mizoguchi. "Intelligent Tutoring Systems: The Current State of the Art," *Trans. IEICE* E73(3):297-307 (Mar. 1990).

Mostow and Aist. "The Sounds of Silence: Towards Automated Evaluation of Student Learning a Reading Tutor that Listens" *American Association for Artificial Intelligence*, Web page, unknown date © 1997.

Mullier et al. "A Web base Intelligent Tutoring System," pp. 1-6, Web page, unverified print date of May 2, 2002.

Nelson et al. "The Assessment of End-User Training Needs," *Communications ACM* 38(7):27-39 (Jul. 1995).

O'Herron. "CenterForce Technologies' CenterForce Analyzer," Web page, unverified print date of Mar. 20, 2002, unverified cover date of Jun. 1, 1999.

O'Roark. "Basic Skills Get a Boost," *Technical Training* pp. 10-13 (Jul./Aug. 1998).

Pamphlet. "On Evaluating Educational Innovations[1]," authored by Alan Lesgold, unverified cover date of Mar. 5, 1998.

Papa et al. "A Differential Diagnostic Skills Assessment and Tutorial Tool," *Computer Education* 18(1-3):45-50 (1992).

Phaup. "New Software Puts Computerized Tests on the Internet: Presence Corporation announces breakthrough Question Mark™ Web product," Web page, unverified print date of Apr. 1, 2002.

Phaup. "Question Mark Offers Instant Online Feedback for Web Quizzes and Questionnaires: University of California assist with beta Testing, Server scripts now available to high-volume users," Web page, unverified print date of Apr. 1, 2002, unverified cover date of May 6, 1996.

Phaup. "QM Perception™ Links with Integrity Training's WBT Manager™ to Provide Enhanced Assessments for Web-Based Courses," Web page, unverified print date of Apr. 1, 2002, unverified cover date of Mar. 25, 1999.

Phaup. "Question Mark Introduces Access Export Software," Web page, unverified print date of Apr. 2, 2002, unverified cover date of Mar. 1, 1997.

Piskurich. "Now-You-See-'Em, Now-You-Don't Learning Centers," *Technical Training* pp. 18-21 (Jan./Feb. 1999).

Read. "Sharpening Agents' Skills," pp. 1-15, Web page, unverified print date of Mar. 20, 2002, unverified cover date of Oct. 1, 1999.

Reid. "On Target: Assessing Technical Skills," *Technical Skills and Training* pp. 6-8 (May/Jun. 1995).

Stormes. "Case Study: Restructuring Techincal Training Using ISD," *Technical Skills and Training* pp. 23-26 (Feb./Mar. 1997).

Tennyson. "Artificial Intelligence Methods in Computer-Based Instructional Design," *Journal of Instructional Development* 7(3):17-22 (1984).

The Editors, Call Center. "The Most Innovative Call Center Products We Saw in 1999," Web page, unverified print date of Mar. 20, 2002,, unverified cover date of Feb. 1, 2000.

Tinoco et al. "Online Evaluation in WWW-based Courseware," *ACM* pp. 194-198 (1997).

Uiterwijk et al. "The virtual classroom," *InfoWorld* 20(47):6467 (Nov. 23, 1998).

Watson and Belland. "Use of Learner Data in Selecting Instructional Content for Continuing Education," *Journal of Instructional Development* 8(4):29-33 (1985).

Weinschenk. "Performance Specifications as Change Agents," *Technical Training* pp. 12-15 (Oct. 1997).

PCT International Search Report, International Application No. PCT/US03/02541, mailed May 12, 2003.

Witness Systems promotional brochure for eQuality entitled "*Bringing eQuality to eBusiness*", undated.

Witness Systems promotional brochure for eQuality entitled "*Building Customer Loyalty Through Business-Driven Recording Multimedia Interactions in your Contact Center*," (2000).

Edward L. Nash, *Database Marketing*, 1993, pp. 158-165, 172-185, McGraw Hill, Inc., USA.

* cited by examiner

METHOD, APPARATUS, AND SYSTEM FOR CAPTURING DATA EXCHANGED BETWEEN A SERVER AND A USER

CROSS REFERENCE TO RELATED APPLICTIONS

This application is related to commonly assigned U.S. patent application Ser. No. 10/061,489, filed Jan. 31, 2002, entitled "Method, Apparatus, and System for Processing Data Captured During Exchanges Between a Server and a User", and U.S. patent application Ser. No. 10/061,491, filed Jan. 31, 2002, entitled "Method, Apparatus and System for Replaying Data Selected from Among Data Captured During Exchanges Between a Server and a User". The contents of these applications are incorporated herein by reference.

BACKGROUND

The present invention is directed to a method, apparatus, and system for capturing data. More particularly, the present invention is directed to a method, apparatus, and system for capturing data exchanged between a server and a user.

For systems employing interactions between a user and server, it is often desirable to be able to view the interactions, ideally in a manner that is transparent to the user. This is particularly desirable in a context such as sales, customer service, or e-commerce, where interactions between customers and a service provider are important indicators of customer satisfaction.

Attempts have been made to recreate interactions between a user and a server. For example, click stream analysis procedures have been used to recreate interactions between a web user and a web service provider. This type of procedure is analogous to reviewing and analyzing the script to a movie. While this procedure reveals some information about the interaction between the server and the user, it does not provide a clear tangible picture of special effects, the environment, chemistry between the user and the server, etc.

Other attempts have been made to replay recorded interactions between a server and a user. However, these attempts are typically implemented at the server and are thus suitable only for a particular type of server.

There is thus a need for a way of capturing data exchanged between a server and a user in a manner that is independent of the server and transparent to the user and that provides a full picture of the interaction between the server and the user.

SUMMARY

The present invention is directed to a method, apparatus and system for capturing data exchanged between at least one server and at least one user.

According to exemplary embodiments, data from the user destined for the server or data from the server destined for the user is intercepted in a capturing module that operates independently from the server and the user. A copy of the intercepted data is stored in a database. The intercepted data destined for the server is forwarded to the server, or the intercepted data destined for the user is forwarded to the user. The intercepting and storing are performed transparently to the user. Interception may be performed continuously. Storing of data may be performed during a predetermined time window or at predetermined time intervals According to exemplary embodiments, the intercepted data includes events, attributes, images, user identifications, requests, and/or responses. Only a predetermined portion of the data and/or data that satisfies predefined rules may be stored.

According to an exemplary embodiment, the user is a web server or a web browser, and the server is a web server. The data may be exchanged in the form of an Internet protocol and assembled into a web page view for the user.

Data may be exchanged between a plurality of servers and the user, the server and a plurality of users, or a plurality of servers and a plurality of users. The intercepting and storing may be performed concurrently for capturing data exchanged simultaneously between the plurality of servers and the user, the server and the plurality of users, or the plurality of servers and the plurality of users.

Further objects, advantages and features of the present invention will become more apparent when reference is made to the following description taken in conjunction with the accompanying drawings.

DETAILED DESCRIPTION

According to exemplary embodiments, data exchanged between a server and a user is captured in a manner that is independent of the server and transparent to the user. In the following description, the server is referred to as a web server, and the user is referred to as a web browser. It will be appreciated, however, that the invention may be applicable to other types of servers and users.

Figure 1A:
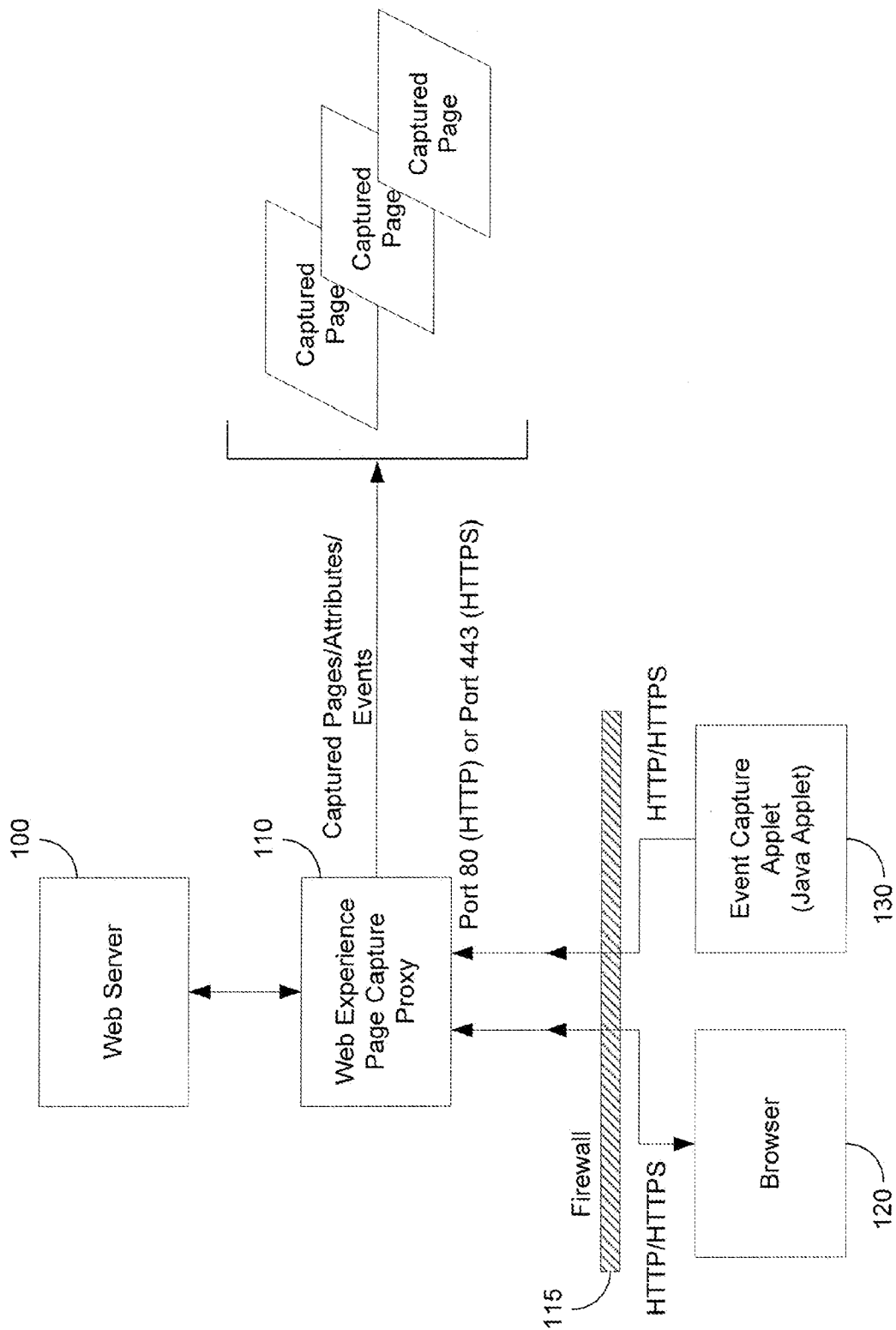
FIG. 1A illustrates an exemplary system for capturing data exchanged between a server and a user.

FIG. 1A illustrates a system for capturing data exchanged between a server and a user according to an exemplary embodiment. The system includes a server, such as a web server 100, a data capturing module, such as a page capture module 110, and a user, such as a web browser 120. Although only one web server 100, page capture module 110, and web browser 120 are depicted in FIG. 1A, it will be appreciated that the invention is applicable to any number of servers, data capturing modules, and users.

The web browser 120 may be implemented in a personal computer, a telephone, etc. The web server 100 may be implemented as a server supporting any operating system, e.g., Unix, Linux, NT or Windows 2000.

The page capture module 110 is arranged between the web server 100 and the web browser 120. For security purposes, a firewall 115 may separate the web browser 120 and the page capture module 110.

The page capture module 110 operates independently from the web server 100 and the web browser 120. Thus, the page capture module 110 does not need to be customized for each type of web server but may be used with any web server, supporting any operating system.

Although the page capture module 110 operates independently from the web server 100 and the web browser, it may be implemented in the same device as the web server 100 or the web browser 120.

According to an exemplary embodiment, the page capture module 110 intercepts data exchanged over the Internet using the HyperText Transfer Protocol (HTTP). Both HTTP (unsecure) and HTTPS (secure) protocols may be supported by the page capture module 110. For secure protocols, a security certificate is shared between the web server 100 and the page capturing module 110. In addition, other types of data stream protocols may be supported, e.g., eXtensible Markup Language (XML) and socket based data transfers.

According to exemplary embodiments, the page capture module 110 acts as a redirection or proxy server from the user's perspective. The page capture module 110 listens on a specified port, such as port 80 for HTTP or port 443 for HTPPS, and then redirects all browser requests to the web server 100, which is configured to listen on a port other than ports 80 or 443. Of course, if the page capture module 110 is implemented in the same device as the web server 100, the web server may listen on the same port. Web server responses are intercepted by the page capture module 110 and redirected back down to the web browser 120.

The page capture module 110 captures pages and other data exchanged between the web server 100 and the browser 120. Pages and other data may be captured continually or at designated intervals or time windows. The page capture module 110 may also record these pages and other data, or recording may be performed in a separate recorder server connected to the page capture module.

Each web browser 120 is assigned a unique machine identity (ID) by the web server 100. A persistent machine ID cookie may be created by the web server 110 and stored at the web browser 120 for this purpose. All pages served to a particular web browser 120 are identified and grouped by the machine ID.

Although the module 10 is described as a page capture module, according to exemplary embodiments, other types of data may also be captured. For example, events and attributes may be captured. Attributes may be captured in a manner similar to that in which pages are captured, as described above.

For event capturing, according to an exemplary embodiment an event capture module captures user side events and delivers these to the page capture module 110. The event capture module may be implemented as an applet 130 that is downloaded to the web browser 120. Although shown as a separate component, the event capture applet 130 is stored at the browser, with parameters such as the web browser machine ID, the host Internet Protocol (IP) address, and the current page name. The event capture applet 130 may be notified, for example, by JavaScript embedded in the current page, whenever an event needs to be recorded. The event capture applet 130 records events such as: page load, page unload, page scroll, page resize, and browser exit The event capture applet 130 sends captured events to the page capturing module 110 via, for example, a Transmission Control Protocol/Internet Protocol (TCP/IP) socket connection on port 80 (or port 443 for secure exchanges).

For event capturing, an HTTP request header containing a unique signature or identifier may be used to send a captured event to the page capture module 110. The unique signature may take the form of an application defined request header. Captured event data may include a browser machine ID, a page name, an event type ID, and event data.

According to an exemplary embodiment, the page capture module 110 intercepts HTTP requests that are identified as event captured HTTP requests and does not send the event captured HTTP request to the web server 110.

Figure 1B:
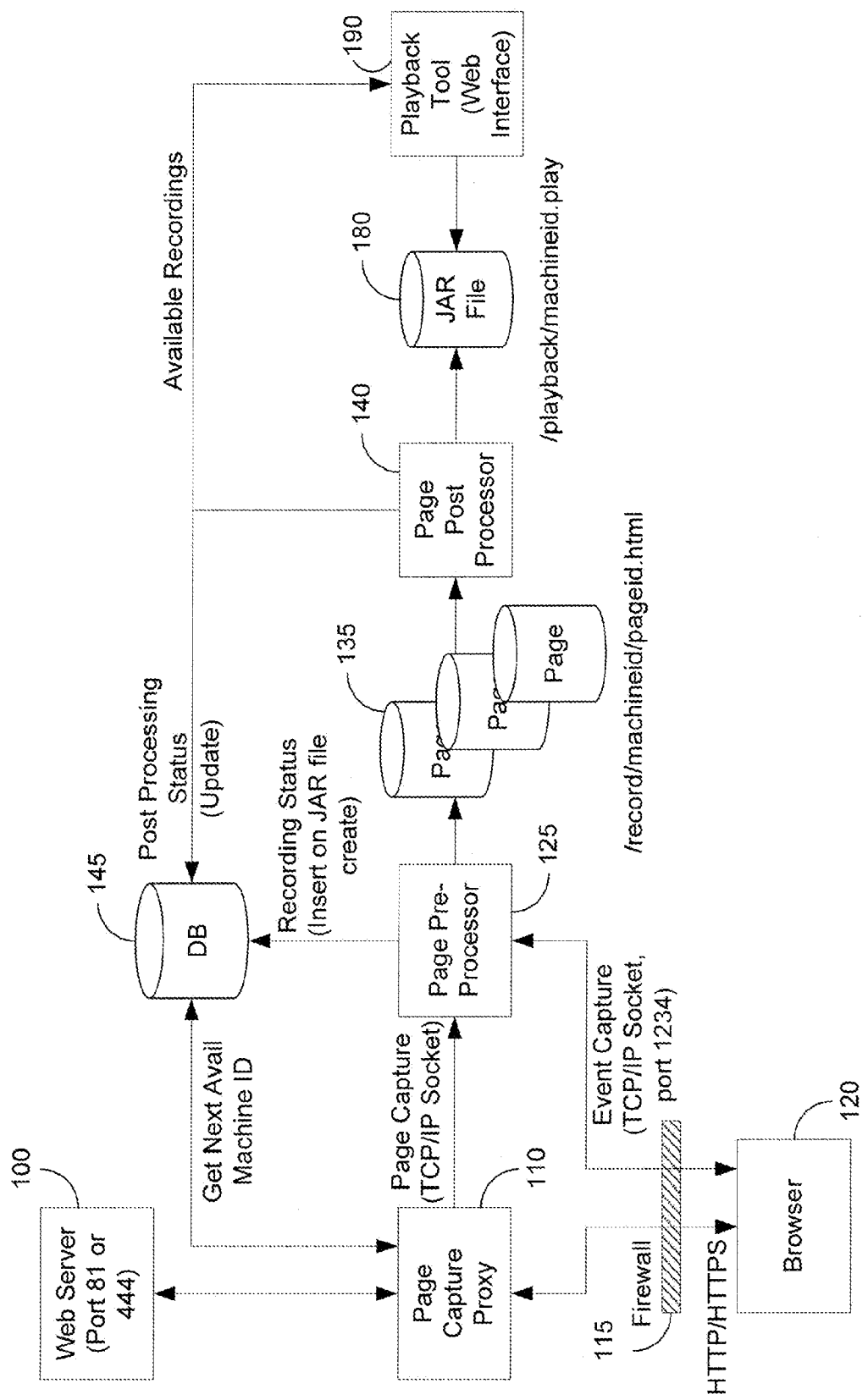
FIG. 1B illustrates an exemplary implementation of the data capturing system.

FIG. 1B illustrates an implementation of the page capturing system in a capturing, processing, and playback system. Pages and other data captured during exchanges between the web server 100 and the web browser 120 at the page capture module 110 are sent from the page capturing module 110 to a page preprocessor 125 via, e.g., a TCP/IP socket.

According to an exemplary embodiment, each captured page is assigned a unique page ID and is associated with a specific browser user machine ID. Each page may also contain the date and time that the page was captured and the page status (recording, processing, playback, etc.) After pages are captured, this information is extracted from the captured page, and a new record is inserted into a database 145.

The page preprocessor 125 acts as a recorder server and stores the captured data in a device such as a database 145. The pages 135 are passed on to the page post-processor 140. Alternatively, the page capture module 110 may perform this recording. To reduce the amount of storage necessary, only predetermined portions of data may be stored, e.g., the request portion or the response portion. Also, only data satisfying predetermined rules, e.g., rules indicating timing, may be stored. When the captured pages are recorded, identifying information may also be recorded, e.g., a session record ID, a date/time of recording, a machine ID, etc.

The post-processing module 140 determines which captured data satisfies predefined rules, e.g., business rules, and records this data in a file 180, such as a Java ARchive (JAR) file. The database 145 is updated to indicate what captured data has been selected and recorded for playback. An exemplary post-processor is described in more detail in the afore-mentioned application entitled "Method, Apparatus, and System for Processing Data Captured During Exchanges Between a Server and a User".

A playback tool 190 selects recorded data from the database 180, using the information in the database 145. An exemplary playback tool is described in more detail in the afore-mentioned application entitled "Method, Apparatus, and System for Replaying Data Selected From Among Data Captured During Exchanges Between a Server and a User".

Although not shown in the interest of simplifying the illustrations, it will be appreciated that the system in FIG. 1B may also include other components, e.g., configuration files used for processing and log files use for storing information for debugging, etc.

Figure 2A:
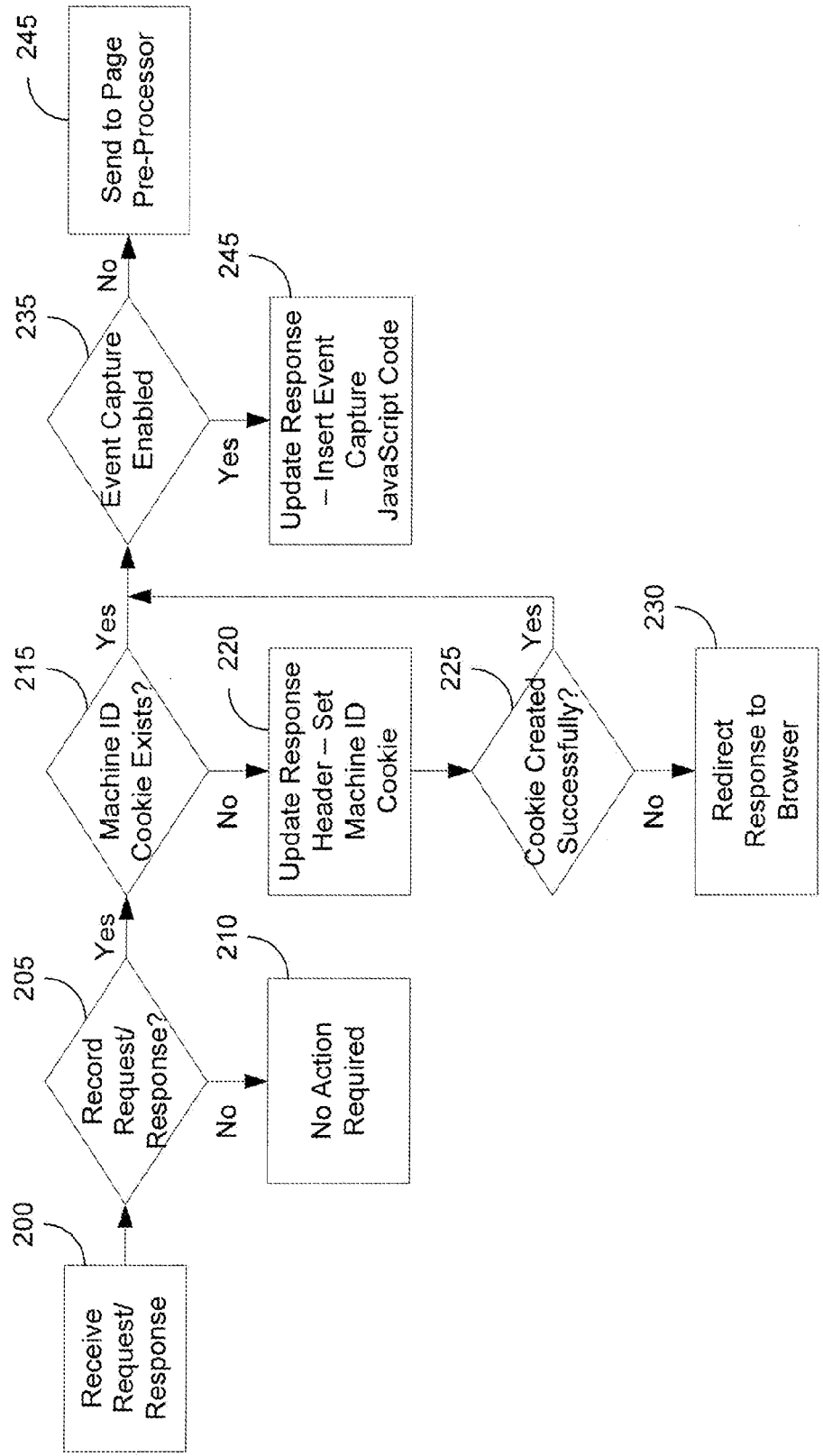
FIGS. 2A and 2B illustrate an exemplary method for capturing and recording data exchanged between a server and a user.

FIG. 2A illustrates an exemplary process for capturing data exchanged between a server and a user. The process begins at step 200 at which the page capture module 110 receives a request/response from the web browser 120 or receives a response/request from the web server 100. The page capture module 110 passes the request/response to the web server 100 or the web browser 120, respectively. At step 205, the page capture module 110 determines whether the request/response is eligible for recording based on, e.g., on timing, content type (for example, text or HyperText Markup Language (HTML)), positioning on a page, etc. If not, the process proceeds to step 210, at which no action is required. If the request/response is eligible for recording, a determination is made at step 215 whether a browser machine ID cookie exists. If not, an attempt to create the cookie is made at step 220. A determination is made at step 225 whether the cookie is created successfully. If not, a cookie create failure is created, and the request/response is redirected to the web browser 120 (or the web server 100) at step 230. Instead of a cookie, it will be appreciated that any other form of persistent ID may be used. For example, a persistent ID may be created using Uniform Resource Locator (URL) rewriting.

If the cookie (or other persistent ID) is created successfully or the browser machine ID cookie exists, a determination is made whether event capturing is enabled, e.g., whether the event capture applet 130 has been notified that an events needs to be recorded, at step 235. If not, the page is sent to the page preprocessor at step 240. Otherwise, the event is captured at step 245.

Figure 2B:
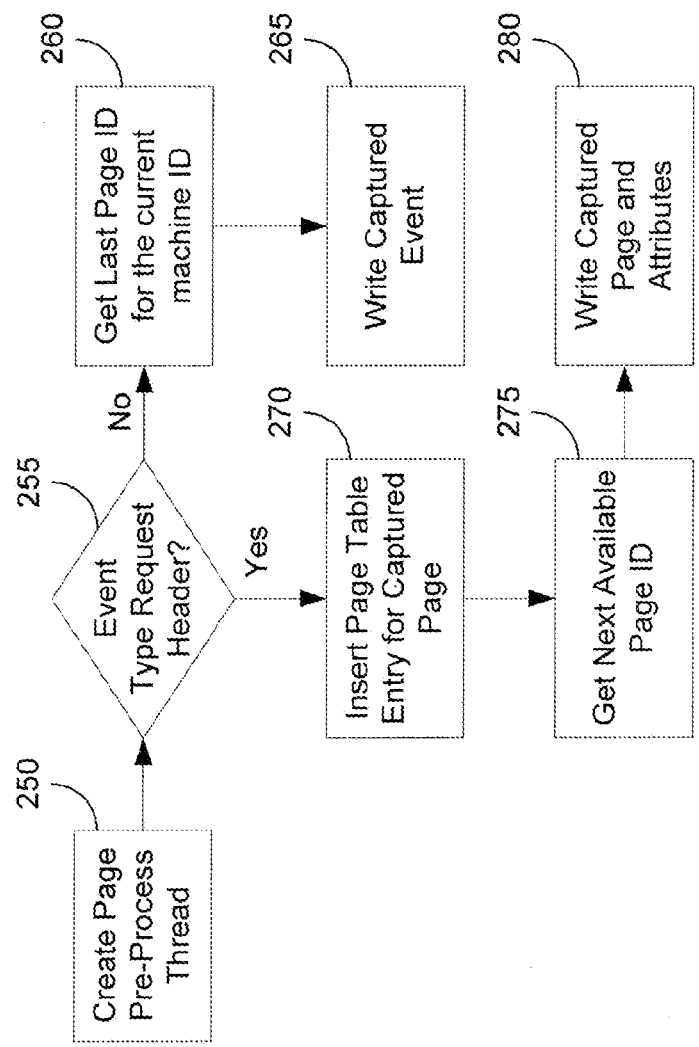

An exemplary process for recording captured requests and responses is shown in FIG. 2B. The process begins at step 250 at which a page preprocess thread is created. At step 255, a determination is made whether there is an event type request header. If not, the last page ID for the current browser machine ID is obtained at step 260, and the captured event is recorded at step 265. If there is an event type request header, a page table entry for the captured page is inserted at step 270 and stored, e.g., in the database 145. At step 275, the next available page ID is retrieved. At step 280, the captured data, e.g., page and attributes, are recorded.

According to exemplary embodiments, a user interaction with a server is captured. For a web user and a web server, this information may be used to recreate the web experience of the user. For example, in a customer service context, the flow of customer inputs and the text and images that are displayed on the pages that are viewed by the customer may be captured and recorded. In such a context, this recreation will provide contact center personnel the ability to observe the customer's experience for the purpose of analyzing how well service was delivered and whether or not the needs of the customer were met. The invention may also be useful in other contexts, such as sales or e-commerce.

According to exemplary embodiments, all the user actions within a browser session may be captured, without degrading the performance of the browser session or web host environment. Also, all captured data may be transmitted efficiently with low network bandwidth utilization. Thousands of concurrent users may be supported simultaneously, with the recording of a large number of sessions that are simultaneously occurring on different web sites provided by various web servers.

It should be understood that the foregoing description and accompanying drawings are by example only. A variety of modifications are envisioned that do not depart from the scope and spirit of the invention. The above description is intended by way of example only and is not intended to limit the present invention in any way.

What is claimed is:

1. A system for capturing data, comprising:
   at least one server;
   at least one user, wherein the server and the user exchange data;
   at least one proxy server connected between the server and the user and operating independently from the server and the user, wherein the proxy server intercepts data exchanged between the server and the user, stores a portion of the intercepted data, and forwards the data from the server or the user to the user or the server, respectively; and
   a filter coupled to the proxy server wherein the filter identifies the portion of the intercepted data by determining if the intercepted data satisfies a predefined rule, thereby producing filtered data for the proxy server to store and discarding intercepted data that does not satisfy the predefined rule;
   wherein the filter works in real-time to filter the intercepted data before the portion of the intercepted data is stored, thereby reducing storage requirements;
   wherein the user is a consumer visiting a site associated with said at least one server; wherein the intercepted data is for use in analyzing the consumer's behavior on the site.

2. The system of claim 1, wherein the proxy server performs intercepting and storing transparently to.

3. The system of claim 1, wherein the data includes at least one of events, attributes, images, user identifications, requests, and responses.

4. The system of claim 1, wherein the data is exchanged in the form of an Internet Protocol and is assembled into a web page for display to the user.

5. The system of claim 3, wherein only a predetermined portion of the data used to display the web page is stored.

6. The system of claim 5, wherein only requests or responses are stored.

7. The system of claim 1, wherein the user is a web server or a web browser, and the server is a web server.

8. The system of claim 1, wherein the data is intercepted continuously and is stored during a predetermined time intervals.

9. The system of claim 1, wherein the stored data is used for replaying data exchanged between the server and the user.

10. The system of claim 1, wherein data exchanged between a plurality of servers and the user, the server and a plurality of users, or a plurality of servers and a plurality of users is captured.

11. The system of claim 10, wherein data simultaneously exchanged between the plurality of servers and the user, the server and the plurality users, or the plurality of servers and the plurality of users is captured concurrently.

12. The system of claim 1, further comprising a playback module configured to generate a playback environment configured to present exchanged data to a reviewer substantially as the exchange occurred.

13. The system of claim 8, wherein the predetermined time window comprises a period of time during which usage of the proxy server is expected to be low.

14. The system of claim 8, wherein the predetermined time interval is based upon an expected interaction volume.

15. The system of claim 1, wherein visiting a site comprises communicating with the server.

16. The system of claim 1, wherein analysis of consumer behavior comprises determining quality metrics associated with an interaction.

17. The system of claim 1, further comprising a data store configured to receive filtered data from the proxy server and to store the filtered data, the filtered data comprising a portion of the intercepted data.

18. The system of claim 17, wherein the portion of the intercepted data to be stored comprises data exchanged between the user and the server, and one or more of a customer identification, a time and data stamp, resolution, interaction length, customer account information, contact information, interaction type, or interaction notes.

19. The system of claim 1, wherein said at least one server comprises a chat server configured to enable a contact center agent to interact with a customer.

20. The system of claim 1, wherein said at least one server comprises a web server configured to receive universal resource locator requests, parse the requests, and provide a requested web pages responsive to the universal resource locator request.

21. The system of claim 1, wherein said at least one server comprises a voice over internet protocol server operable to communicate packetized voice data between an agent and a user.

22. The system of claim 1, wherein said at least one server comprises an electronic mail server operable to communicate electronic messages between an agent and a user.

23. The system of claim 1, wherein the portion of the intercepted data to be stored is stored in a Java archive file format.

24. The system of claim 1, further comprising a firewall configured to block malicious connection requests to the server and the proxy server.

25. The system of claim 1, wherein the exchange data is encrypted.

* * * * *

UNITED STATES PATENT AND TRADEMARK OFFICE
CERTIFICATE OF CORRECTION

| | | |
|---|---|---|
| PATENT NO. | : 7,219,138 B2 | Page 1 of 1 |
| APPLICATION NO. | : 10/061469 | |
| DATED | : May 15, 2007 | |
| INVENTOR(S) | : Christopher Straut et al. | |

It is certified that error appears in the above-identified patent and that said Letters Patent is hereby corrected as shown below:

In the drawings, Sheet 3, Fig. 2A, the reference numeral 245 attached to the block labeled "Send to Page Pre-Processor" should be replaced by the reference numeral 240.

Signed and Sealed this

Thirteenth Day of January, 2009

JON W. DUDAS
*Director of the United States Patent and Trademark Office*